July 27, 1965 F. LITZKA 3,197,610
HONEY-COMB GIRDERS
Filed May 10, 1960 11 Sheets-Sheet 2
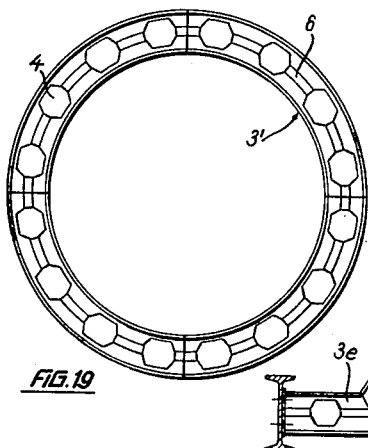
FIG.19
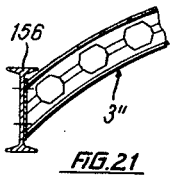
FIG.21
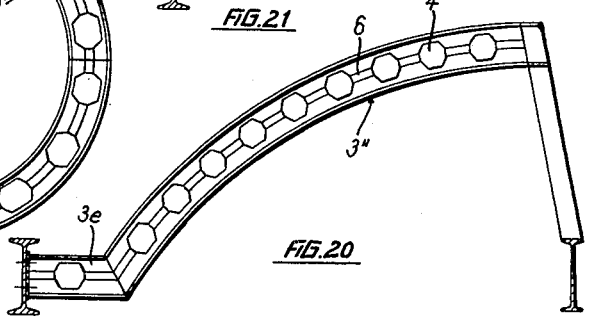
FIG.20
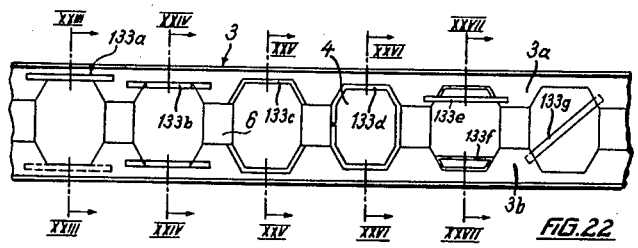
FIG.22
 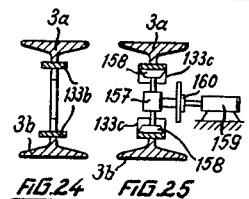 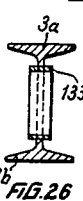  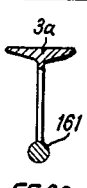 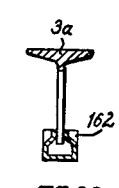 
FIG.23  FIG.24  FIG.25  FIG.26  FIG.27  FIG.28  FIG.29
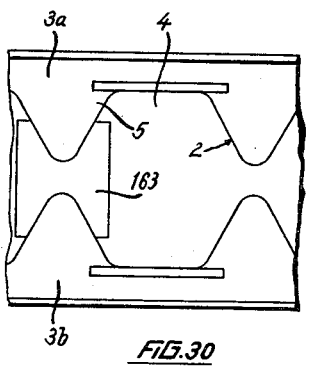 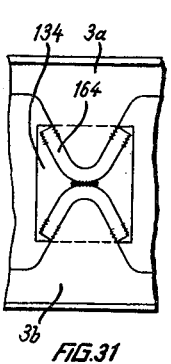 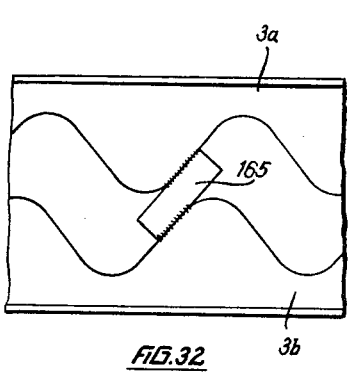
FIG.30  FIG.31  FIG.32
INVENTOR.
FRANZ LITZKA
BY
Mestern & Kollin,
ATTORNEYS

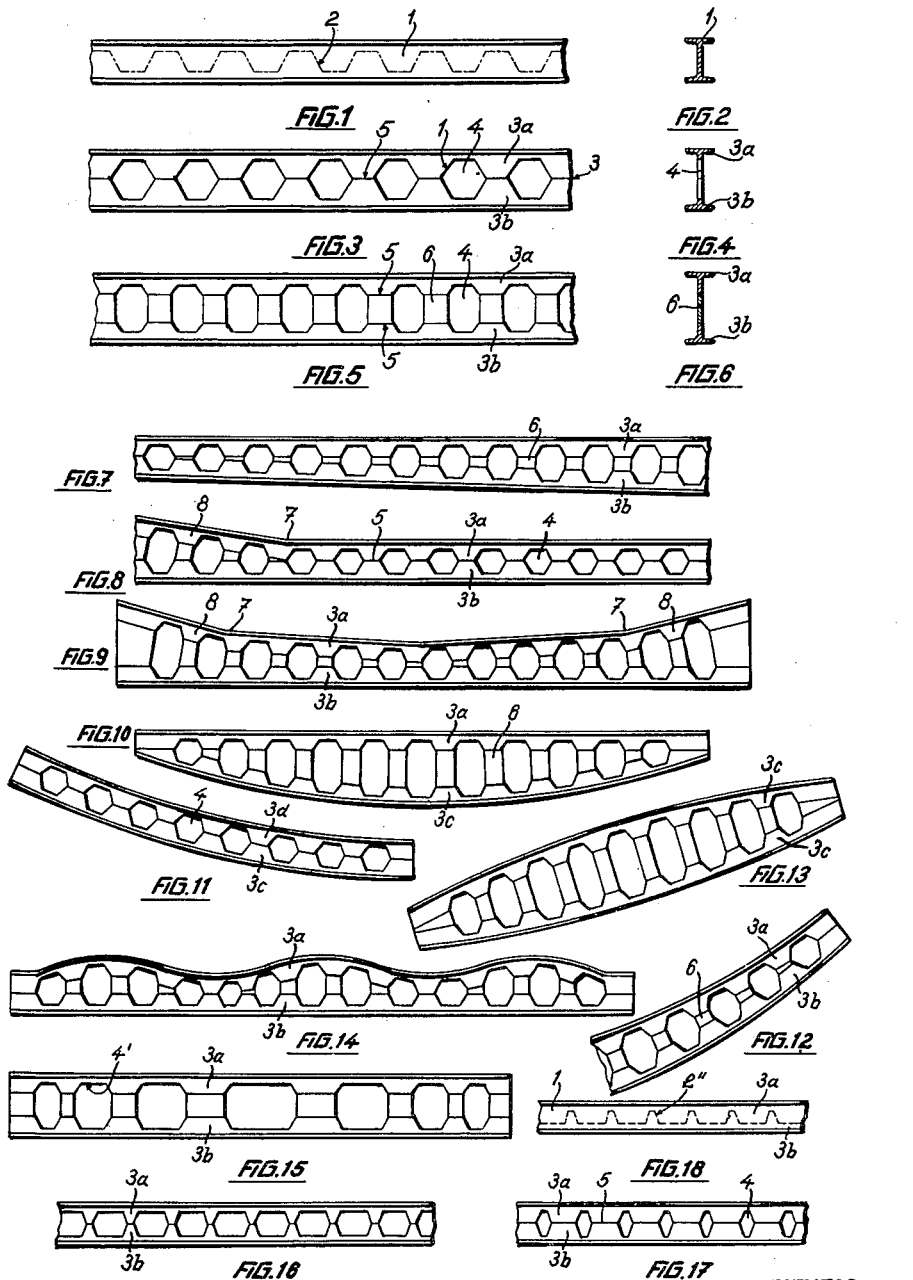

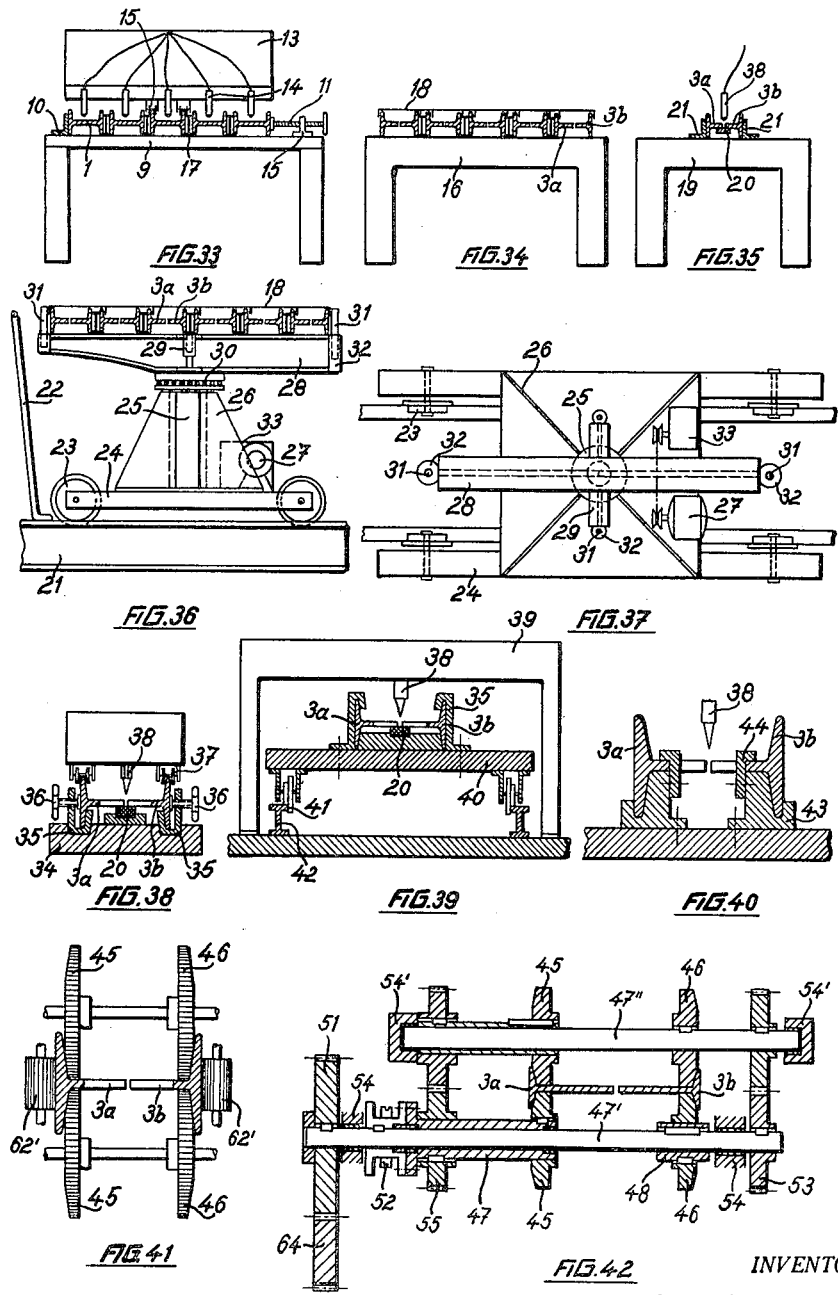

July 27, 1965   F. LITZKA   3,197,610
HONEY-COMB GIRDERS
Filed May 10, 1960   11 Sheets-Sheet 4
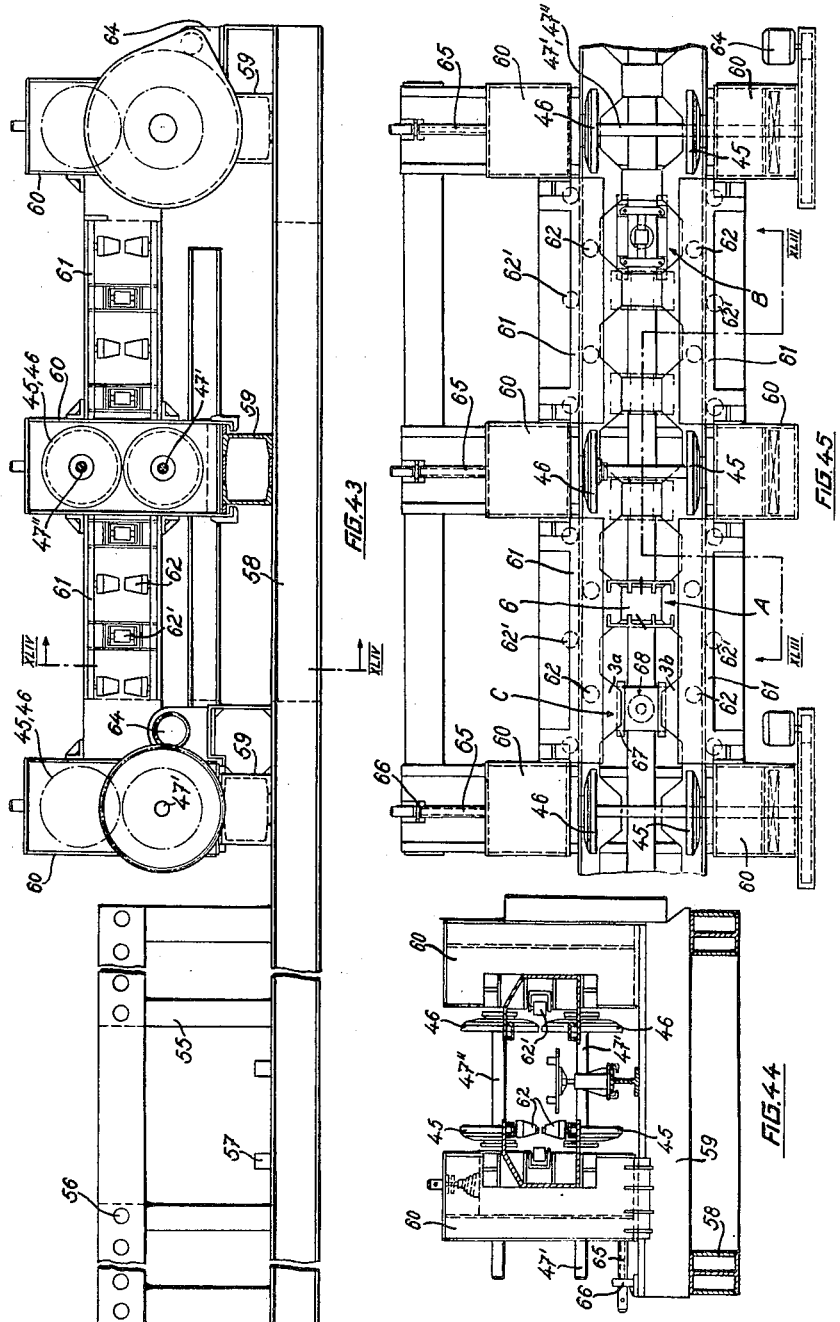
INVENTOR.
FRANZ LITZKA
BY
Mestern & Rollin
ATTORNEYS July 27, 1965 F. LITZKA 3,197,610
HONEY-COMB GIRDERS
Filed May 10, 1960 11 Sheets-Sheet 5

INVENTOR.
FRANZ LITZKA
BY
Mestern & Kollin
ATTORNEYS

July 27, 1965  F. LITZKA  3,197,610
HONEY-COMB GIRDERS
Filed May 10, 1960  11 Sheets-Sheet 6
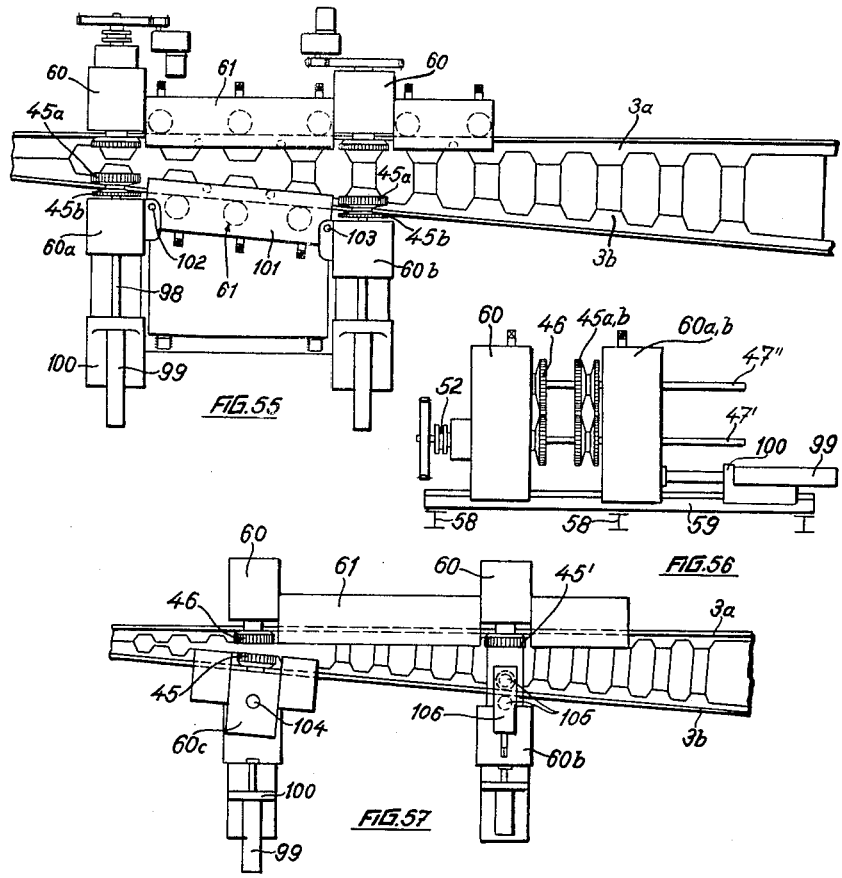
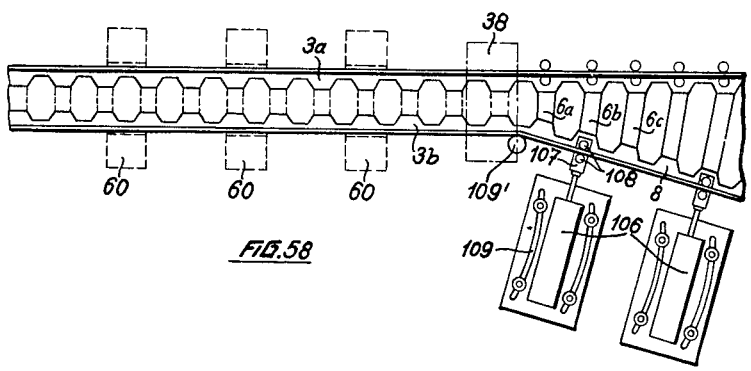
INVENTOR.
FRANZ LITZKA
BY
Nestern & Kolin
ATTORNEYS July 27, 1965  F. LITZKA  3,197,610

HONEY-COMB GIRDERS

Filed May 10, 1960  11 Sheets-Sheet 7

INVENTOR.
FRANZ LITZKA
BY
Mestern & Rollin
ATTORNEYS

July 27, 1965  F. LITZKA  3,197,610
HONEY-COMB GIRDERS
Filed May 10, 1960  11 Sheets-Sheet 8

INVENTOR.
FRANZ LITZKA
BY
Mestern & Rollin
ATTORNEYS

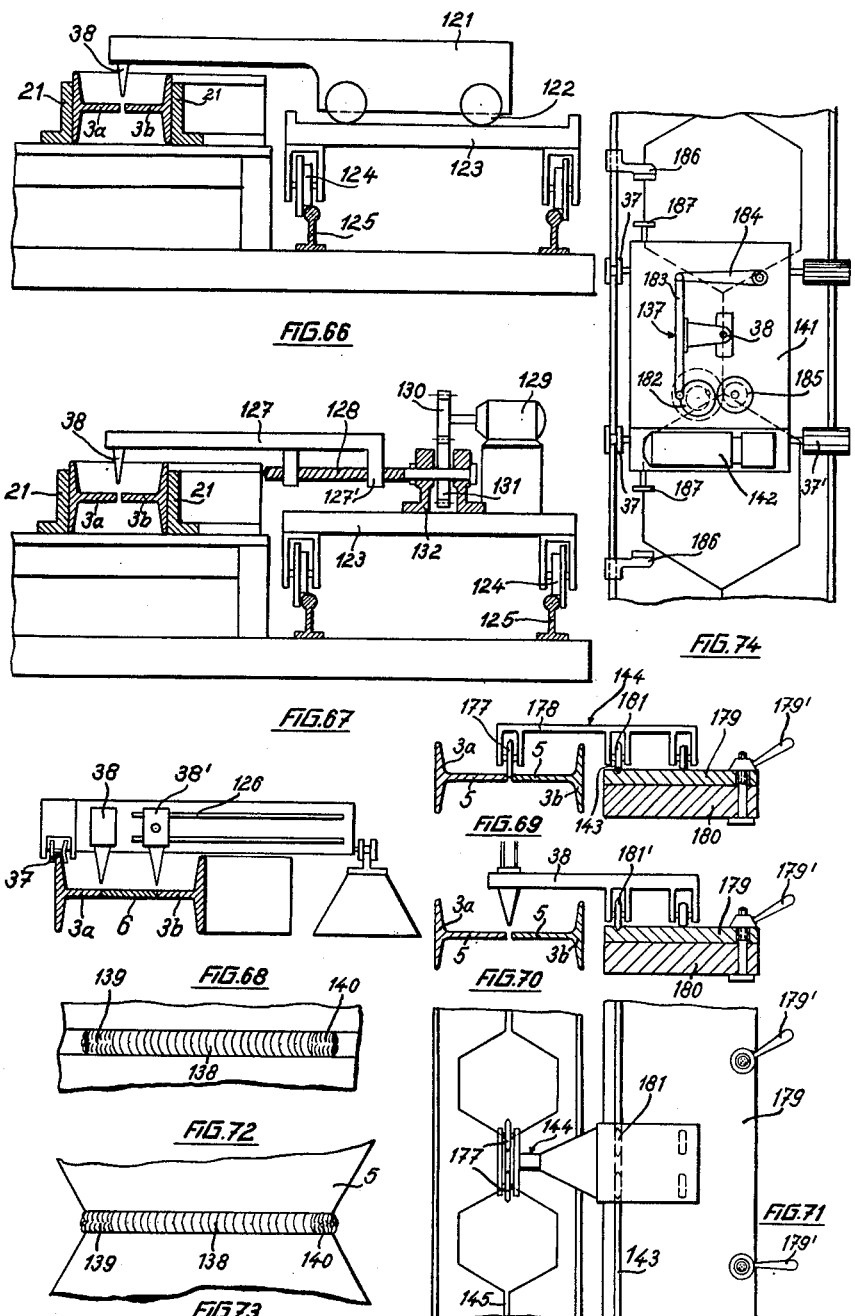

July 27, 1965  F. LITZKA  3,197,610

HONEY-COMB GIRDERS

Filed May 10, 1960  11 Sheets-Sheet 10

INVENTOR.
FRANZ LITZKA
BY
Mestern & Rollin
ATTORNEYS

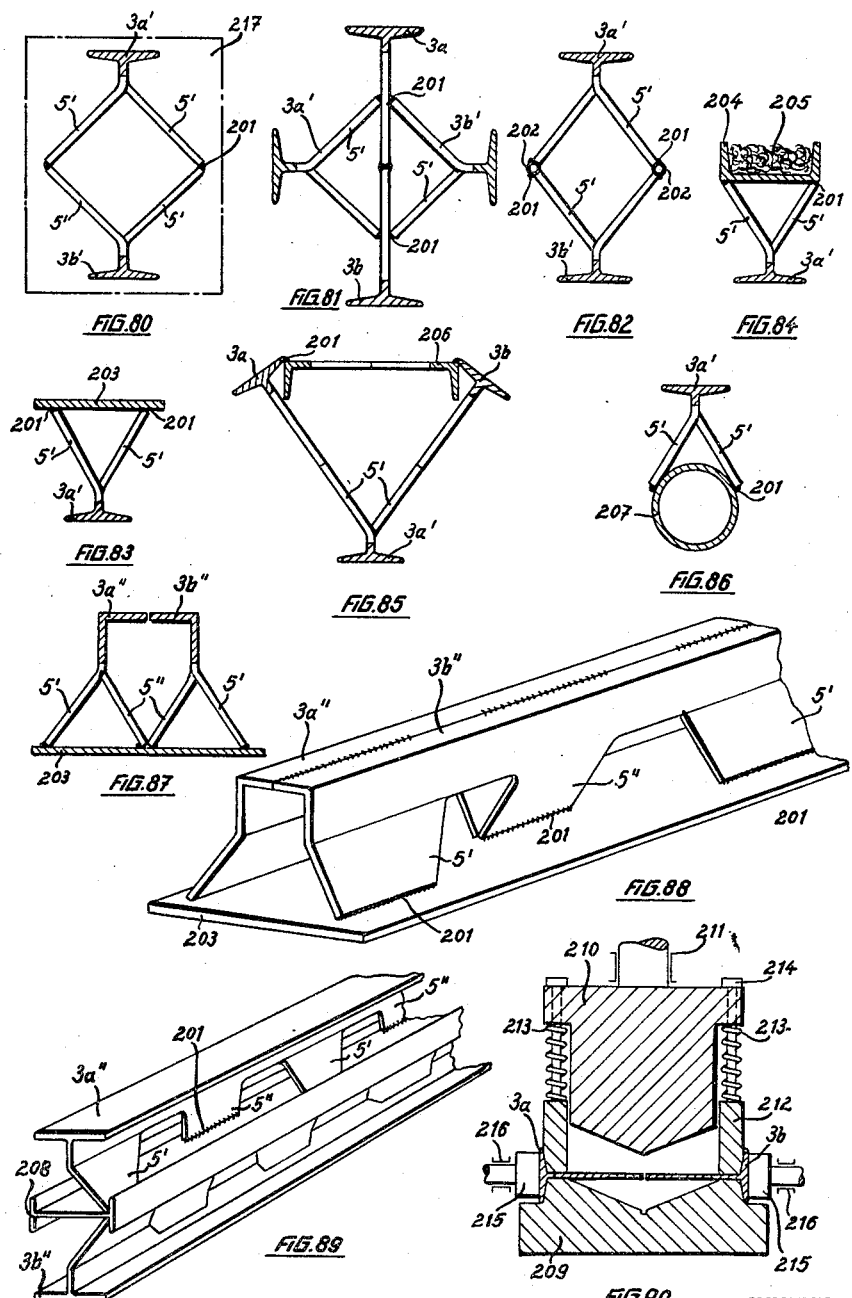

United States Patent Office 3,197,610
Patented July 27, 1965

3,197,610
HONEY-COMB GIRDERS
Franz Litzka, Haus 29, Marktredwitz, Bavaria, Germany
Filed May 10, 1960, Ser. No. 28,094
Claims priority, application Germany, May 13, 1959,
L 33,217
7 Claims. (Cl. 219—124)

The invention concerns the fashioning of honeycomb girders with an improved bearing strength and also methods and apparatuses for producing such a girder and other welded girders, the disclosed methods and apparatuses being adapted to serve the production of known or new honeycomb girders and also of solid girders.

The invention moreover concerns the solution of the problem to align and to guide girder sections the web of which has a saw tooth-like configuration in such a manner that the webs can be welded together or by interposition of web plates manually, semi- or fully automatically.

Such girder sections, the cross-section of which can have any configuration, are obtained by cutting the webs of solid girders, the cutting line extending approximately in the shape of a continuous undulation or saw-tooth line.

The separated girder sections are then transposed along their longitudinal axes to such an extent that the individual tooth-like projections are situated opposite to the webs to enable the girder sections to be welded together at these projections. Hence honeycomb-like apertures are formed between the projections. Such honeycomb girders welded together and known per se are distinguished by a greater depth of web relative to that of the original solid web girder and consequently by greater bending strength. If a honeycomb girder is compared with a solid web girder of equal size it is ascertained that the honeycomb girder is substantially lighter and owing to the saving in material substantially cheaper.

The separation of single I section girders and the manual welding of the webs of these girder sections is known. The manual welding method however involves the considerable difficulty in that the separated girder sections lose their constancy of shape and have therefore to be welded together in an undulated state. Thus the necessary time of alignment to straighten out the girder sections is so great that it is not possible to obtain a substantial saving in costs compared with normal I-shaped girders having a deep web.

An object of the present invention is to straighten, within a short time and in a simple manner, girder sections which are undulated due to their separation and at the same time to effect the transposition of the individual girder sections thus making it possible for the straightened girder sections to be welded manually and also semi- or fully automatically in one operation.

According to the present invention a honeycomb girder comprises at least two girder sections interconnected by welding, which are formed by separating the web of a solid web girder along a line of tooth configuration and the two parts thus formed being welded together again after being transposed through about half a tooth length, the honeycomb girder being provided with web extension plates welded between the respective webs of the two parts to increase the bearing strength of the girder and/or at least in a part is provided with a shape in which the flanges are curved or bent and/or deviate from their normal positions parallel to one another.

Also according to the present invention in a method for producing honeycomb girders a solid web girder is separated along a line of tooth configuration, the two parts of the girder thus produced being transposed longitudinally relative to one another by a distance equal to approximately half a tooth length welded together.

An apparatus in accordance with the invention for producing honeycomb girders, solid web girder, which is separated along a line of tooth configuration, the two parts of the girder thus produced being shifted relative to one another and longitudinally by distance equal to approximately half a tooth length, the spacing members being interposed between the two separated parts, comprises a welding unit having a welding head and a conveying and guiding device in the form of a support arranged adjoining a roller track, having at least two drawing roller pairs acting against the web surfaces and undersides, several guide rollers acting against the flange surfaces and under-sides being provided for each girder part.

One method of forming a girder may consist in straightening out the girder parts which have become undulated due to the cutting operation, in the same operation as the cutting, by means of conveying and guide rollers, the welding being carried out immediately subsequent thereto.

A driving device which, at first, may individually displace each of the two girder parts along their longitudinal axes may also be capable of displacing both the girder parts mutually and intermittently continuously along the longitudinal axis. A suitable semi- or fully automatic welding unit for this purpose may advantageously be so constructed that at least its welding heads are adapted to be reciprocated in the direction of the longitudinal girder axis and welding effected during the temporary standstill of the girder parts.

A further particularly advantageous step may consist in the fact that the undersurfaces of the girder webs, as also the beginning and end of the intended weld seam, may have ledges or blocks of non-weldable material pressed thereagainst which, at least in the region of the welds, may be provided with groove-like depressions to form the weld seams on the underside of the girder webs and also at the beginning and end of the weld seam.

The invention will be described further, by way of example, with reference to the accompanying drawings, in which FIGS. 1 and 3 are side elevations of known type honeycomb girders but constructed by the method and apparatuses of the invention;

FIGS. 2 and 4 are respective corresponding plans;

FIGS. 5 and 7 to 18 are side elevations of girders which are constructed in accordance with the method and apparatuses of the invention, i.e. in honeycomb form;

FIG. 6 is a cross-section corresponding to FIG. 5;

FIG. 19 is a plan view of an example showing the use of a curved honeycomb girder;

FIG. 20 is a plan view, partly in section, showing a further example of the use of a curved honeycomb girder;

FIG. 21 is a part fragmentary plan, part section, of another example of the use of a honeycomb girder;

FIG. 22 is a plan view incoporating various types of honeycomb girders having additional bracing elements;

FIGS. 23 to 27 are sections on the lines XXIII—XXIII, XXIV—XXIV, XXV—XXV, XXVI—XXVI and XXVI—XXVI respectively;

FIGS. 28 and 29 are cross-sections through a honeycomb girder;

FIGS. 30 to 32 are part elevations of honeycomb girders having bracing elements acting as web plates;

FIG. 33 is a diagrammatic cross-section through a cutting plant;

FIG. 34 is a cross-section of an intermediate place of deposit for a cut girder;

FIG. 35 is a cross-section through a welding plant;

FIG. 36 is a side view, partly in cross-section, of a bogie having a superimposed lifting device for moving the cut girders from the cutting plant to the welding plant;

FIG. 37 is a corresponding plan;

FIGS. 38 to 40 are cross-sections through some example of welding plant in which the cut girder sections are rigidly connected with supporting means;

FIG. 41 is a diagrammatic cross-section through a conveying and guide roller system for guiding and moving a cut I-section girder;

FIG. 42 is a cross-section through a driving device for two pairs of conveying rollers;

FIG. 43 is a side elevation of a welding plant having bearing supports for conveying and guide rollers;

FIG. 44 is a corresponding plan;

FIG. 45 is a corresponding cross-section;

FIG. 55 is a plan view showing a welding plant adapted to produce tapering honeycomb girders;

FIG. 56 is an end elevation taken from the left-hand side of FIG. 55;

FIG. 57 is a plan view of an alternative type of welding plant to the one shown in FIG. 55;

FIG. 58 is a diagrammatic plan of a welding plant for producing a honeycomb girder having a tapering rise at one end at least;

FIGS. 66 to 68 are diagrammatic cross-sections through welding plants in which at least one welding head executes a movement at right angles to the longitudinal direction of movement;

FIGS. 69 and 70 are cross-sections showing a centering device, in two different positions, for the automatic adjustment of a welding head in relation to the correct position of the seam to be welded;

FIG. 71 is a plan corresponding to FIG. 69;

FIG. 72 is a diagrammatic plan of a weld seam;

FIG. 73 is a corresponding cross-section;

FIG. 74 is a plan of a welding device having a separate drive for a welding head;

FIGS. 80 to 87 are cross-sections of differing shapes of honeycomb girders, the web sections of which are chamfered at the side;

FIGS. 88 and 89 are perspective views of differing shapes of honeycomb girders, the web sections of which are chamfered at the side; and FIG. 90 is a cross-section through a pressing device for chamfering the web sections.

Figure 46:
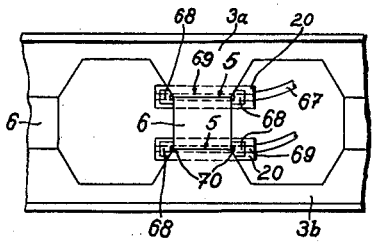
FIG. 46 is a plan showing ledges of non-weldable material which are pressed against a girder web in the region of the welding point.

In the partly known honeycomb girder sections shown in FIGS. 1 to 18 it is assumed, by way of example, that a double T-shaped solid-webbed girder is used as the starting material which is processed to form double T-shaped honeycomb girders. It is thus also possible for other solid web girder sections to be used, depending upon the section of a honeycomb girder to be produced.

In FIGS. 1 and 2 there is shown a known type solid web double T-section girder 1, the web of which is separated along an undulating or trapezoidal line 2.

Individual girder sections 3a and 3b are moved apart and then longitudinally transposed in such a manner that web regions are oppositely disposed, the girder sections subsequently being welded together again at points 5 and honeycombs 4 thus produced. This manufacturing method is known but the technical accomplishment involves difficulties which are practically impossible to overcome, as the separated girder sections 3a, 3b tend to become greatly distorted.

As shown in FIGS. 3 and 4 it is evident that the honeycomb girder 3 welded together in the above mentioned manner has a substantially greater overall depth than the double T-section girder shown in FIG. 2, although the weight of the girder 3 has remained the same. Due to the greater depth of web the honeycomb girder 3 has a greater resistance to bending than the double T-section girder 1 (FIGS. 1 and 2) having a solid web. The honeycombs 4 formed between the welding positions 5 have however, a certain unfavourable effect on the resistance to bending of the honeycomb girder 3. Honeycomb girders of the type shown in FIG. 3 are known and are shown in order to prove that the subsequently described devices and methods are also able to produce such girders.

In FIGS. 5 and 6 there is shown a girder having web plates 6 inserted between the girder sections 3a and 3b, which further increase the depth of web, hence increasing resistance to bending of the honeycomb girder 3. Welding together such girder sections 3a, 3b with interposed web plates 6 is hereinafter described as indirect welding of the girder sections 3a and 3b. When the web plates 6 are longer than the web sections 5 there is achieved a qualitatively better start and finish of the weld seam.

By continuously increasing the length of the web plates 6 it is possible to produce tapering honeycomb girders of the type shown in FIG. 7.

In FIG. 8 there is shown a honeycomb girder having a tapering rise 8 imparted thereto at one or both ends, which rise starts at a point 7. The centre region of this girder can be of parallel design (FIG. 8) or of tapering design (FIG. 9).

In FIG. 10 there is shown a honeycomb girder composed of a straight girder section 3a and a curved girder section 3e, between which, web plates 6 are inserted. The curved girder section 3c may be produced by deforming a girder section 3c of the type shown in FIG. 3.

In FIG. 11 there is shown the possibility of both girder sections 3c and 3d being bent and welded together with or without web plates. The solid-webbed girder having a cutting line 2 (FIG. 1) of different periodic lengths is separated, the two periodic lengths in question being so dimensioned that they conform with the girder sections of the FIG. 11 embodiment curved with different radii. The upper girder sections having the greater periodic length than the lower girder sections of smaller periodic length are then welded together.

It is also possible to produce curved and tapering honeycomb girders, in which the web plates 6, progressively increasing in length with respect to the depth of web, are welded between the girder sections 3a, 3b in order to obtain a tapering effect. It is however also possible for both girder sections, obtained from a solid-web girder or strip metal, be welded together with the same graduation, since the differences in measurement resulting during the bending operation can be compensated by means of the web plates.

These methods of procedure, moreover, also make it possible to develop other honeycomb girder combinations, for example, as shown in FIGS. 13 and 14, in which the depth of web is greatest at the points where they are subjected to the greatest load.

Since it is possible during the separation of the solid-webbed girder to increase or reduce the individual the periodic length of the cutting line, honeycomb girders of the type shown in FIG. 15 may also be produced in which the honeycombs 4, at the points of maximum loading, have a small cross-section and at the other points have a greater cross-section.

An advantageous embodiment of honeycomb girder is shown in FIGS. 16 to 18, proceeding from the fact that two girders of equal depth of web but unequal bearing strength are to be produced. In this case a solid web girder as shown in FIG. 18 is cut along the line 2″, thus creating girder sections 3a, 3b of differing shape; the upper girder section 3a is welded to another similar upper girder section in mirror image and two lower girder sections 3b are interconnected in the same manner. Thus there are created honeycomb girders of the type shown in FIG. 16 having wide honeycombs 4 and consequently low bearing strength and honeycomb girders of the type shown in FIG. 17 having narrow honeycombs 4 and higher bearing strength. In this way a cutting operation is saved. FIGS. 19 to 21 explain the significance of producing curved honeycomb girders.

As shown in FIG. 19 a circular girder 3′ is constructed from a plurality of honeycomb girders, for example, for supporting a gas boiler of any diameter.

The curved girder 3″ shown in FIG. 20 is particularly suitable for shed constructions or other unsupported roofs, it being advisable also to use curved tapering girders of the type shown in FIG. 12. The girder 3″ has a connecting part 3e welded thereon adapted to be flanged to other girders, e.g. stanchions. In the case of the girder shown in FIG. 21 the honeycomb girder 3″ is flanged to a cross-girder 156.

Honeycomb girders may advantageously be braced. As shown in FIGS. 22 to 27 it has been acknowledged that a noticeable increase of bearing strength can be achieved when the honeycomb girder 3, in the region of its weakened points thus in the region of its honeycombs 4, is provided with additional bracing elements 133 welded thereon. Bump or bulge bracings have already been proposed. These are not however suitable to remove girder weakening due to the honeycombs. There will be described the procedure for bracing the honeycomb itself and/or to return it to a definite static shape.

For simplicity's sake FIG. 22 shows several bracing alternatives which are detailed in cross-section in FIGS. 23 to 27.

In the example shown in FIG. 23 bracing elements 133a are of ledge-like design and welded flush against the webs 5 of the girder sections on the upper and lower edge of the honeycombs 4. Whether these elements 133a are arranged on one or the other side or on alternate sides can be left to the discretion of the manufacturer.

In the example shown in FIG. 24 ledge-like bracing elements 133b are provided with slot-shaped recesses at both ends, the width of which corresponds to the thickness of the web of the individual girder sections 3a, 3b. The elements 133b are inserted obliquely in the honeycomb 4 and then displaced to the upper and/or lower edge of the honeycomb and finally welded to the girder web. The width of the recesses may be so selected that it corresponds to the maximum web thickness; if thinner webs are used at least one of the shanks defining the recess is laterally expanded to the dimension of the thickness of web provided.

Bracing elements 133c shown in FIG. 25 are formed in the shape of a honeycomb and on the one side are welded to the edge of the honeycomb and on the other side the end faces of the elements are supported against protruding points of the web plates 6 (FIG. 22). It is an advantage to make the web plates 6 longer than the leading edges of the girder webs, since in this case the welding head can be already ignited a short distance in front of the start of the web. In this manner there is obtained a very favourable start and termination of the weld seam. It is thus an advantage to insert the bracing elements 133c either as flat ledges or as pre-shaped yokes in the honeycombs 4 and to press them by means of double-acting pressure elements, e.g. presses 157, 158, against the edge of the honeycomb and to weld them there. The elements are thus provided with a pre-tension which counteracts the bearing force. It is also advisable to provide a further lifting cylinder 159, 160 which carries the first cylinder 157, 158 and slides it into and out of the honeycomb 4. This step is of particular advantage in automatic girder production. Instead of the ledge-shaped yokes 133c it is also possible to use other profiles, e.g. round bars, rods, tubes etc.

In the example shown in FIG. 26 a bracing element 133d is in abutment over the whole edge of the honeycomb 4 and hence provides an extremely high bracing effect.

Bracing elements 133e and 133f shown in FIGS. 22 and 27 have a T-shaped cross-section or a similar profile. The element 133e, in the manner shown in FIG. 24 is designed with recesses on either side of the T-shaped flange, whereas the element 133f is inserted in the honeycomb and welded to the honeycomb edge. In both instances it is advisable to chamfer the T web of the element 133f, 133e, corresponding to the honeycomb shape.

It is also possible for the bracing elements 133g shown in FIG. 22 to be so arranged that they connect the two girder sections 3a, 3b in a strut-like manner. It is thus evident that there are numerous possiblities for additionally bracing a honeycomb girder and to prevent possible deformation of the web regions forming the honeycombs. It is advisable, in particular, to fit the bracings at the points of the girder most subjected to loading. Thus, for example, bracings arranged in the center of the girder act as substitute for a barrel-shaped honeycomb girder. Bracings moreover make it possible to select smaller dimensions than necessary for the girder sections, as the bracings provide the necessary safety factor.

The fact that it is not necessary only to interconnect T-shaped girders is evident from the examples shown in FIGS. 28 and 29, in which it is shown that the lower chord is a solid or hollow round bar 161 or U-shaped profile 162 which, at the connecting points with the upper girder section 3a are inwardly expanded. Other profiles, e.g. L or Z-profiles or simple metal strips may be used for the constructed girder in accordance with the invention.

In the embodiments shown in FIGS. 30 to 32 are honeycomb girders in which the bracing elements 163 to 165 can replace the web plates 6. This is based on the fact that the cutting line 2 of the honeycomb girders extends in an undulatory manner so that the direct welding of the girder sections 3a, 3b provides too small a welding seam. The undulatory cutting line moreover provides the advantage that the individual girder section has a greater rigidity.

The bracing element 163 in the example shown in FIG. 30, embraces in a part region the edge of the web 5. In the case of FIG. 31 the ledge-like bracing element 164 is additionally welded to a bracing plate 134. As shown in FIG. 32 the girder sections 3a, 3b are somewhat laterally transposed so that the bracing element 165 is tangent to the edges of the web 5 and forms a wide bridge adapted to receive and transmit the load. Further advantageous girder shapes are shown in FIGS. 80 to 89.

The following explanations are concerned with illustrating the methods and apparatuses for producing honeycomb girders of any kind, more especially of the shape shown in FIGS. 1 to 32.

It has been recognized that it is expedient to effect the cutting and welding together of the girders on the same location, i.e. the same workshop. A diagrammatic view of this method is evident from the FIGS. 33 to 35. The solid-web girders which have not yet been separated (FIG. 1) rest on a trestle 9 as shown in FIG. 33. The girders are rigidly interconnected by means of distance pieces 17 and supporting and bracing means e.g. a spindle 11 and a stop 10. The flanges of the girder 1 may be separately held by means of the distance piece 17. In this example a cutting device 13, on which cutting heads 14 and the rollers 15 are arranged, rolls along the center girder 1. During the movement of the cutting device 13 in the direction of the longitudinal axis of the girder, the cutting burner 14 executes a transversing movement, thus enabling the cutting line 2 corresponding to FIG. 1, to be obtained. Though cutting the girder does not form the subject matter of the invention; an example is mentioned at this point to illustrate in full the course of the overall production of a honeycomb girder.

When the solid-web girders 1 have been separated they are lifted off the work trestle 9 and moved to the side on to an intermediate depositing point 16 shown in FIG. 34. Prior to this the cut girder sections 3a and 3b are conveniently clamped together by clamps 18, thus preventing these girder sections from being deformed relative to one another. The girder sections 3a and 3b of a solid-web girder are then removed from the support 16 and moved on to a trestle 19 on which these girder sections 3a and 3b are welded together. Each girder section 3a and 3b, in this general example, is rigidly connected with a suitable fixing means 21, for example, an angle girder, thus preventing the individual girder sections 3a, 3b from warping. A welding device 38 shown in FIG. 35 is for welding the girder webs to one another. Beneath the welding positions a ledge 20 of non-weldable material, e.g. copper, is provided, the object of which is to prevent the welding seam from penetrating.

In a plant of the type shown in FIGS. 33 to 35 it is advisable to provide, below the supporting devices 9, 16 and 19 a rail track 21 extending at right angles to the longitudinal axis of the girder (FIG. 36); bogies 24 as shown in FIGS. 36 and 37, are adapted to be moved along the rails 21 and are provided with lifting devices 25 to enable the girders to be lifted out and conveyed to the next adjacent support. In the region of these rails 21 of course the supporting devices 9, 16, 19 are disconnected.

As shown in FIGS. 36 and 37 the conveying device consists of the bogie 24 having wheels 23 which roll along the rails 21. This bogie is movable by manual or mechanical means with the aid of a stirrup 22.

Arranged on the bogie 24 is a lifting cylinder 25 which is braced by means of gusset plates 26. Connected first to the piston of the lifting cylinder 25 is a rotary bearing 30 and a supporting cross shaped member 28, 29 one cross-beam 28 of which is longer than the other cross-beam 29. When it is necessary for the cut girders 1 shown in FIG. 33 to be moved to the support 16 shown in FIG. 34, then the supporting cross 28, 29 is swung about in such a manner that all the cut girders 1 can be supported on the cross-beam 28. At the ends, this cross-beam 28 is provided with bosses 32 into which the bolt-like stops 31 for defining the girders 1 and/or the girder sections 3a, 3b can be inserted. To convey two girder sections 3a, 3b from the support 16 to the welding device 19, 38 the whole length of the cross-beam 28 is not required. For this reason the supporting cross 28, 29 is swung through 90° thus permitting the cross-beam 29 to be used as the support for the two girder sections 3a, 3b. This cross-beam 29 is also provided with bosses 32 on its end into which stops 31 can be inserted. Arranged moreover on the bogie 24 are a motor 27 and a pump 33 for feeding the lifting cylinder 25.

FIGS. 38 to 40 show diagrammatically a cutting method for single honeycomb girders 3 in which the individual girder sections 3a and 3b are joined by way of stationary fixing means which are rigidly connected with the girder flanges before the solid-web girder 1 is separated (FIG. 1). In the case of FIG. 38 the individual flange of the girder section 3a and 3b is arranged in a channel section 35 and clamped in position by means of the screws 36. These channel sections 35 are let in a base 34 and centered. The ledges of non-weldable material 20 are disposed between the channel sections 35. The welding unit 38 is adapted to be moved along the girder flanges or separate guide tracks by means of rollers 37.

In FIG. 39 there is shown the reversal of movement of the welding device. In this example the welding device 38 is fixedly located in a frame 39, whereas the girder sections 3a, 3b clamped in position, are braced with Z-shaped profiles 35, which in turn are clamped on a bogie 40 adapted to be displaced along rails 42 by means of rollers 41.

An alternative fixing means, which is shown in FIG. 40 consists of the girder flange being guided in supports 43 and clamped firmly in position by means of brackets 44, the latter being let in the honeycombs 4 (FIG. 3) and rigidly connected with the supports 43.

Conveying and guide rollers 45, 46, 62' shown in FIGS. 41 and 42 make it possible, in a particularly favourable manner, for the cut girder sections 3a and 3b to be welded together without being connected with fixing means, the deformation of the girder sections 3a and 3b due to the girder 1 being cut, having no influence. The pairs of conveying rollers 45, 46 engage the upper and undersides of the webs of the girder sections 3a, 3b. Thus it is advisable for the outer surfaces of these pairs of conveying rollers 45, 46 to be bevelled to enable them to abut against the inside surfaces of the flange. The outer surfaces of the flange are guided by the guide rollers 62' thus making it possible for the individual girder section 3a or 3b to be guided, conveyed and to be straightened within the conveying and guide rollers 45, 46, 62'. The outer surfaces of the conveying roller pairs 45, 46 are conveniently roughened, fluted or provided with a gripping surface in any other manner in order that, when the girder sections 3a, 3b are conveyed, slipping between these roller parts, 45, 46 and the webs of these girder sections is prevented.

FIG. 42 shows an example by means of which it is possible to move the girder section 3a independently of the other girder section 3b. This difference in the course of movement is of particular advantage when the girder sections 3a, 3b are to be transposed in their longitudinal direction within the guide device to cause the web regions 5 (FIG. 3) to be in mirror image alignment with one another. One conveying roller 45 is mounted on a hollow shaft 47 and connected with a driving wheel 51 by means of a coupling 52. The other conveying wheel 46 is mounted on a second hollow shaft 48, which is non-rotatably connected with a driving shaft 47'. An upper driving shaft 47" and hence the upper conveying roller 46 can be driven via a gear wheel 53. The driving shaft 47' is mounted in fixed bearings 54; the upper driving shaft 47" is advantageously mounted in slide-block bearings 54' which are guided so as to be displaced up and down and possibly spring-loaded. The hollow shaft 47 and also the secondary part of the coupling 52 are rotatably mounted on the driving shaft 47' which makes it possible for the conveying rollers 45, 46 to be laterally adjustable.

When introducing the girder sections 3a, 3b into the conveying and guide roller system the coupling 52 is first engaged to the left so that the driving shaft 47' only drives the right hand roller pair 46, whereas the flow of energy to the left hand roller pair 45 is interrupted by the coupling 52 and consequently the left girder section 3a is not moved. The other girder section 3b, via the drive 53, the hollow shaft 48 and the conveying wheel 46, are moved along their longitudinal axes until the welding positions 5 of the girder sections 3a, 3b are in perfect register (FIG. 3). The coupling 52 is then engaged to the right thus causing both conveying rollers 45 and 46 to be driven by the driving shaft 47'. In this case both girder sections 3a and 3b are mutually guided and conveyed.

A gearing (not shown) which permits a step by step shift of these conveying wheels 45, 46 can conveniently be connected with the gear wheel 51. This gearing may comprise a pawl and ratchet gearing, crank gearing or any other gearing having a stop. Since such gearings are known per se it is unnecessary for them to be shown in the drawings.

A side elevation of a welding plant shown in FIG. 43 and acknowledged as advantageous, in which for the sake of simplicity the welding head is not shown, makes it evident that a guiding device 60 supporting the conveying and guide rollers 45, 46 has a roller track mounted in front thereof, which comprises a frame 55 having several rollers 56 mounted therein.

Rails 57 for guiding the lifting device shown in FIGS. 36 and 37, are situated below the roller track 55, 56. To permit the lifting device to be slid into the roller track it is advisable to construct this roller track of a plurality of roller track trestles 55, between which the rails 57 are arranged.

The guiding device shown in FIG. 43 comprises bearing supports 60 for mounting the conveying rollers 45, 46 and their drive. Trestle bridges 61 are arranged between these supports 60 in which guide rollers 62 and 62' are mounted. As shown in particular in FIG. 44, the guide rollers 62 are tapered, the angle of the taper corresponding to the angle of pitch of the girder, since these guide rollers 62 engage on the inside surfaces of the girder flanges. These guide rollers are designed in accordance with the design of the flanges; therefore they may, for example, when producing Peiner girders, be of cylindrical shape. Each bearing support 60 is arranged on a cross-girder 59 which, in turn, is fixed on a longitudinal stringer 58. As shown in FIGS. 44 and 45 the bearing supports 60 of one row of supports are adjustable relative to the longitudinal direction of the girders. The example described in these figures comprises spindles 65 which are mounted in separate pedestal bearings 66. The bearing supports 60 may however be mutually adjustable, for example, by providing a bevel gear by which they are connected with a central spindle or the like. Furthermore it is advisable for the centremost support 60 of the row of supports to be fixedly located to be adjustable at right angles, whereby the possibility is given to produce curved honeycomb girders.

FIG. 45 moreover shows three working positions A, B and C, which are of significance for a continuous and/or a step by step course of the welding operation on the honeycomb girder. At the position A the web plates 6 are inserted between the webs of the already straightened girder sections 3a, 3b by means of a special clamping device, a particular feature consisting in that the clamping device is supported against the webs and together with the girder sections 3a, 3b are conveyed to the position B. At the position B a lifting device is provided which is described in detail with reference to FIGS. 50 and 51. This lifting device presses the ledges and/or blocks (FIGS. 35 and 36 and 39) against the underside of the web and/or against the start and finish of the welding seam in order to permit a satisfactory welding seam to be obtained on the underside of the web. The inserted honeycomb girder is welded, if necessary, by interposition of web plates 6 in the region of the working position B. This position B may be provided at any point after the position A. To ensure satisfactory earthing of the welding current, a further lifting device is provided at the working position C which, when the girder sections 3a, 3b are stationary, presses ledges 67, chiefly of copper, against the underside of the webs. These ledges 67 are earthed; thus they serve to conduct the welding current away. A hydraulically or pneumatically actuated lifting cylinder 68 is advantageously provided as a lifting device. FIG. 45 also shows that merely the roller pair 45, 46 in the front and rear bearing support 60 is driven by means of electric motors 64, whereas the conveying rollers 45, 46 in the centre bearing stand 60 rotate due to friction with the web of the girder sections 3a, 3b and only serve for guiding the girder sections.

Figure 47:
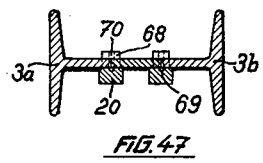
FIG. 47 is a corresponding cross-section.

The ledges or blocks of non-weldable material especially of copper, which are advantageous for forming the welding seam, as shown in FIGS. 46 and 47 consist of two elongated ledges 20 which are pressed from below against the underside of the web of the girder sections 3a, 3b. At least one groove-like depression 69 is formed in the surface of these ledges 20 which is located in register beneath the welding point 5 (FIG. 3). When depressions 69 have been formed in all four longitudinal sides of the ledges 20 it is possible, by twisting the ledges 20 for the use of new ledges to be avoided by closing one depression. Blocks 68 abut against these elongated ledges 20 which strike against the front and rear end face of the web. On the end face these blocks 68 are also provided with groove-like depressions 70, namely at the point where the welding seam starts and terminates. The ledges 20 may be cooled by cooling means via conduits 67.

Figure 48:
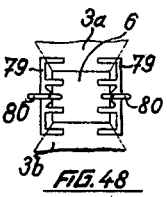
FIG. 48 is a plan showing a supporting device for inserting web plates between the girder webs.
Figure 49:
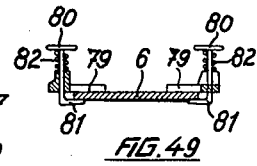
FIG. 49 is a corresponding cross-section.

The clamping device corresponding to the working position A (FIG. 45) comprises, as shown in FIGS. 48 and 49, conveniently a comb-shaped upper part 79, the outer prongs of which abut against the webs of the girder sections 3a and 3b. The web plate 6, shown separately in FIG. 49, is retained by a latch 80, 81, which is urged upwardly by means of the compression springs 82. Thus the web plate 6 is clamped between the comb-like upper portion 79 and the lower portion of the latch 81. As soon as the web plate 6 is held in position or welded at the position B (FIG. 44), the clamping devices 79, 80 can be removed again.

Figure 50:
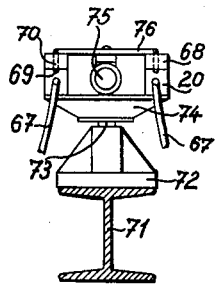
FIG. 50 is a plan showing a lifting device by means of which the ledges shown in FIGS. 46 and 47 are urged against the girder webs.
Figure 51:
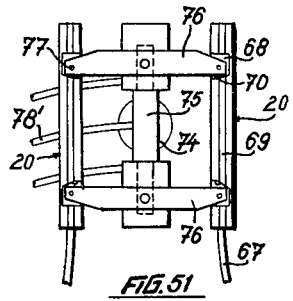
FIG. 51 is a corresponding cross-section.

As shown in FIG. 44 a girder 71, which is described in detail in FIG. 50, on which is arranged a pedestal bearing 72 with a lifting cylinder 73 is situated below the working position B. The piston of the lifting cylinder 73 has a supporting plate 74 connected thereto on which the ledges 20 in accordance with FIGS. 46 and 47, are mounted. A horizontal double-acting lifting cylinder 75 is provided between these ledges 20 on the supporting plate 74 with traverse-like stirrups 76 being connected to the piston of the cylinder 75, blocks 68, in accordance with FIGS. 46 and 47, being journalled at 77 on the ends thereof. When an individual web plate 6 is to be welded, then the lifting cylinder 73 is first urged upwardly so that the ledges 20 strike against the underside of the flanges of the girder sections 3a, 3b. The lifting cylinder 75 is then caused to retract resulting in the blocks 68 abutting against the front and rear end faces of the webs and the web plate 6. The web plate 6 can now be welded in position. It may also be advisable to use copper rolls in place of the ledges 20, which rolls are on the same level as the welding head 38; these rolls have a groove-shaped notch provided therein to form the underside of the welding seam.

Figure 52:
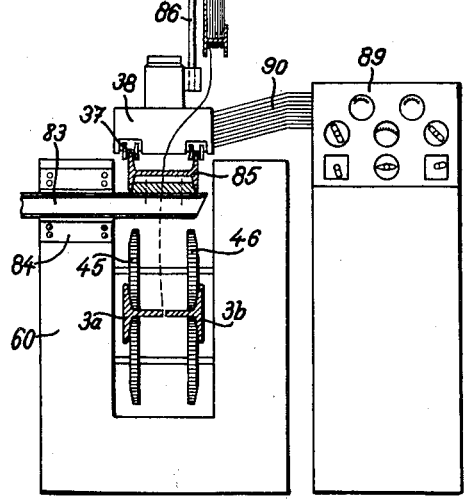
FIG. 52 is a diagrammatic cross-section through a welding plant having a welding head adapted to be reciprocated in the longitudinal direction of the girder.

FIG. 52 shows the arrangement of the welding device 38 in relation to the bearing supports 60 of the guiding devices. A transversely extending rail 83, which by means of a flange 84 is guided and fixed on the support 60, is mounted on a bearing support 60. A longitudinal girder 85 on which the welding device 38 is adapted to be reciprocated by means of the rollers 37 is rigidly connected with this rail 83. The welding device 38 has a support 86 mounted thereon on which a drum 87, for winding the welding lead 80, is rotatably mounted. The welding device 38 is connected, by means of electric leads 90, with a switch board 89, by means of which is effected the regulation of welding device, more especially the timed reciprocating movement and also the regulation of the conveying rollers 45 and 46. When honeycomb girders having a varying depth of web are to be welded, it is advisable for the rail 83 to be laterally adjustable, to permit the welding head 38 to be constantly guided along the girder axis and/or the welding points.

Figure 53:
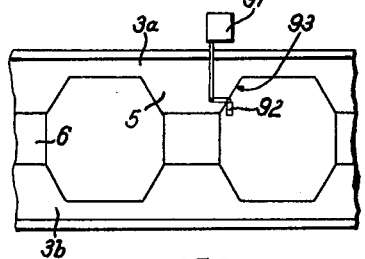
FIG. 53 is a plan view of an electric operating plant for actuating a progressively displaceable driving device of the type shown in FIG. 42.
Figure 54:
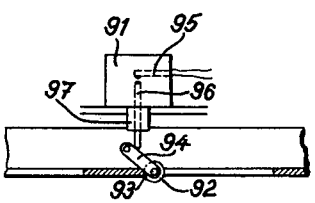
FIG. 54 is a corresponding cross-section.

A suitable regulating device for the step by step switching of the girder sections 3a and 3b and also for the welding device 38 is shown in FIGS. 53 and 54, a feeler roller 92 being connected with a switching element 91. This roller 92, when the girder sections 3a, 3b are advanced, strikes against the end face 93 of one girder web, thus causing an electric switching impulse to stop the girder. As shown in FIG. 54 the switching roller 92 is mounted on a lever 94 with which a contact rod 96 is connected. This contact rod 96 guided in a bearing 97, makes contact with the roller 92 of a counter-contact 95 when the roller 92 is swung upwardly.

For producing tapering honeycomb girders a device of the type shown in FIGS. 55 to 57 is recommended. According to these, at least two bearing supports 60a and 60b are adjustable relative to the longitudinal stringers by means of hydraulic presses 99 mounted in a bearing 100. Conveying rollers 45a, 45b of one side are of divided construction and hence each individual part 45a and/or 45b is independently mounted on the shaft, the distance between these parts may be varied by choice. A guiding device 101 situated between the supports 60a and/or 60b is pivotally journalled to these supports 60a and/or 60b at points 102 and 103. In this manner any angular position of the guiding device 10 relative to the fixed row of supports 60 is obtained; it being possible to provide slots in the device 101 for adaptation to different angular positions. The other bridge 61, between the bearing supports 60 in this example, is conveniently arranged to be fixedly located.

When welded, the girder sections 3a, 3b are introduced from the left into the guiding device, thus welding of the girder commences at the end having the maximum depth of web. In this instance the two bearing supports 60a and/or 60b are at their ends remote from the opposite supports 60. The further the girder sections 3a, 3b are displaced to the right, the closer will the bearing supports 60a, 60b have to be moved in the direction of the fixed support 60. The step by step or continuous displacement of these bearing supports 60a and 60b is effected in synchronism with the advancing movement of the girder sections 3a, 3b. It is evident from the discharge of the driving shafts 47' and 47'' shown in FIG. 56, to what extent the bearing supports 60a, 60b are adapted to be displaced on the guide bed 59.

An alternative device to the one shown in FIGS. 55 and 56 is shown in FIG. 57 and consists in that a bearing support 60c is pivotally mounted in a bearing 104. Thus it is possible for this bearing support 60c to be brought into the position in which the flat surface of the conveying roller 45 assumes a position parallel to the flange plane of the girder section 3b. In this case it is unnecessary for this conveying roller pair 45 to be divided.

Conveying rollers 105 are provided the axis of which extends vertically in other bearing supports 60b. These rollers 105 need not be driven; it suffices for them to be in the form of guide rollers. The two girder sections 3a, 3b are first manually tacked together at the end with the maximum depth of web, they are then moved automatically in a continuous or step by step manner. The conveying roller 45' of the fixed support 60 besides the rollers 45, 46 alone takes over the continued conveying since, due to the previous tacking, the whole honeycomb girder is shifted, even if the conveying rollers 45' and 46 act upon one girder section 3a only.

It is explained with reference to FIG. 58, how honeycomb girders can be produced, one end of which is conically splayed out. According to this example the two girder sections 3a, 3b are individually or mutually passed through the guiding device 60 without these girders being welded together. If extension webs 6 are to be welded in, it is possible for them to be already connected rigidly with the girder section 3a manually or automatically. The freely protruding end of the girder section 3b is then bent at an angle sideways, by means of a pressure cylinder 106, pressure rollers 108, which are connected with piston 107 acting upon the flange of the girder section 3b. Bending of this girder section 3b is effected about a roller 109'. The web plates 6a, 6b, 6c are manually welded to the girder section 3b, whereupon the girder is completed in accordance with the methods described. The pressure cylinders 106, can moreover, by means of the links 109, be set in any inclined position.

Figure 59:
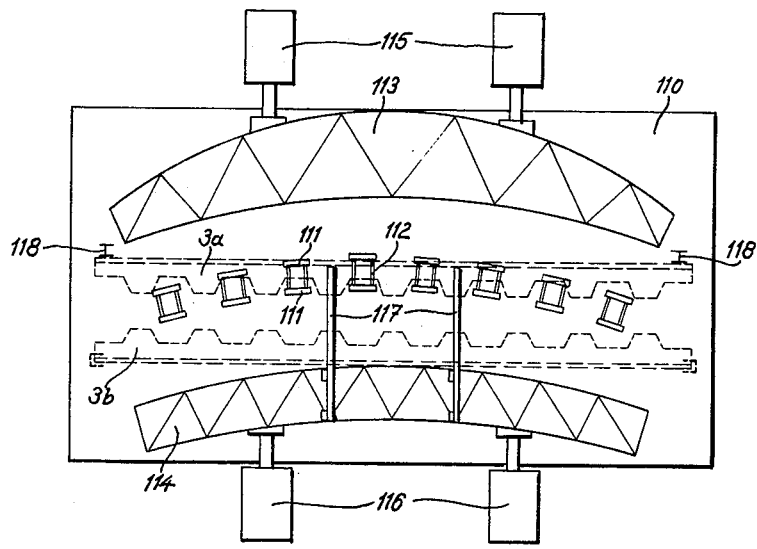
FIG. 59 is a plan showing an example of a welding plant adapted to produce curved honeycomb girders.
Figure 60:
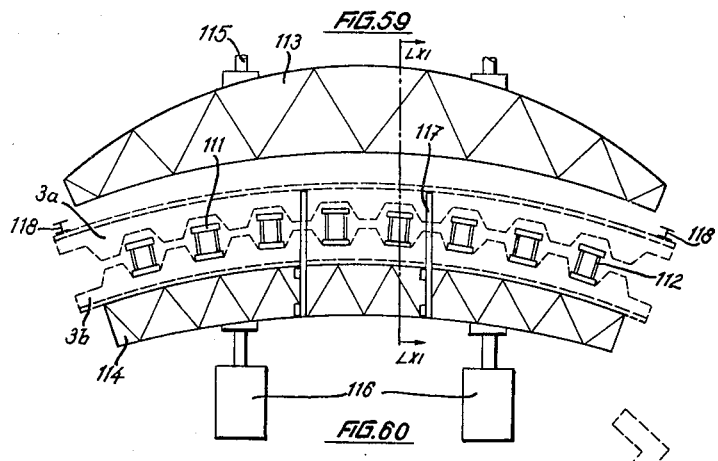
FIG. 60 is a corresponding elevation.
Figure 61:
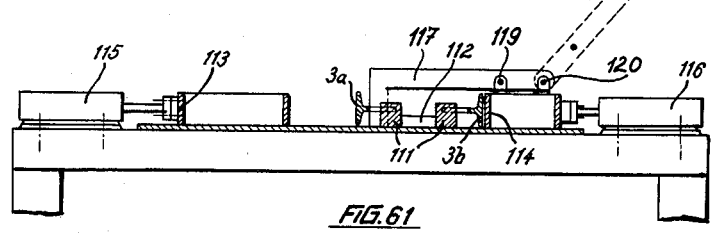
FIG. 61 is a corresponding cross-section.

The production of curved girders of the type shown in FIG. 11 is advantageously effected with a device of the type shown in FIGS 59 to 61. Several block-like shapes 111 are mounted on a working plate 110 between each of which shapes 111 a space is left. Distance elements 112 are provided between two opposite parallel shapes 111. These shapes 111 are mounted in an arcuate line which corresponds to the subseqeunt shape of the girders 3a, 3b to be welded, the distance between the shapes 111 being so dimensioned as to enable the webs 5 of the girder sections 3a, 3b to be introduced into this free space. These girder sections 3a, 3b are now pressed into the shapes 111 by means of curved girders 113 and 114 which are driven by means of hydraulic or pneumatic presses 115, 116. At first the curved girder 114 is advanced in the direction of the shapes 111, causing the centre region of the girder section 3b to deflect. Pressure stirrups 117 are connected with the curved girder 114, the front ends of the stirrup acting upon the flange of the girder section 3a. As the ends of this girder section 3a are held against stops 118, the centre region of the girder section 3a, when the curved girder 114 is advanced, is moved to beyond the shapes 111, whereupon this girder section 3a is pressed on to the working plate 110. It is now possible for both curved girders 113 to be moved further in the direction of the shapes 111 until the webs of the girder sections 3a, 3b arrive in the free spaces between the shapes and finally are situated opposite one another in register. The curved girder can now be welded together. FIG. 61, by way of a complementary view, also shows the mounting of the pressure stirrups 117 on the curved girder 114, this pressure stirrup 117 being mounted so as to be pivoted about a point 120. A bore 119 serves the rigid fixing of the stirrup 117 on the curved girder 114. Over and above this it is advisable to provide separate centering elements in the centre of the row of shapes 111 or on the shaping girders 113, 114 to allow the girder sections 3a, 3b to find their way more readily into the gaps between the blocks.

Figure 62:
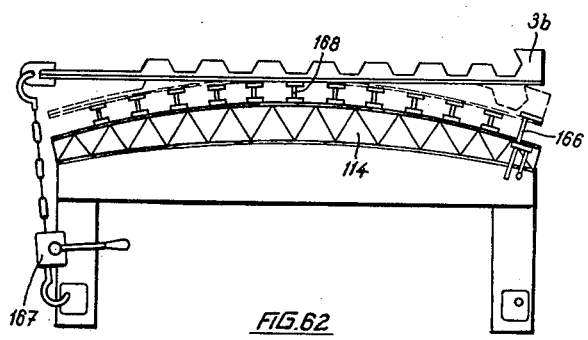
FIGS. 62 to 65 show further examples of devices for producing curved honeycomb girders as alternatives to FIGS. 59 to 61.

If it is desired to save using lifting cylinders 115, 116 as shown in FIG. 59, it is possible for the individual honeycomb girder section 3b to be held on one side by means of clamping brackets 166 on a shaping girder 114 and on the other side to be deflected by means of a block and tackle 167 (FIG. 62). It is also possible for blocks and tackles to be provided on either side.

FIG. 62 moreover shows the general conception of producing with a single shaping girder 114 curved girder sections 3a, 3b having different radii of curvature or curvatures deviating from circular shape, by the insertion between the girder section 3b and the shaping girder 114 of distance elements 168 of any kind or shape. In the present case the elements 168 serve to form a curved girder with a larger radius.

Figure 63:
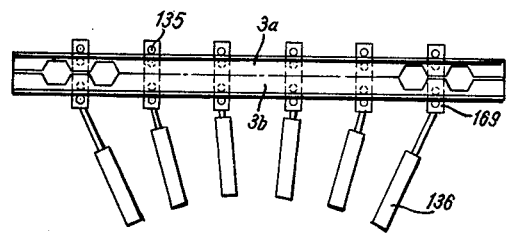

A further alternative of a suitable device for producing curved girders is shown in FIG. 63 and consists in that the girder sections 3a, 3b are slid into guide roller pairs 135 and for the lifting cylinder 136 in approximate circular arrangement to be actuated until the desired shape of curved girder has been formed. The roller pairs 135 are thus connected with the pistons of the cylinders by means of girders 169.

It is possible for curved girders to be produced in the same manner if they are introduced into the guiding and conveying device 60 of FIG. 45 and then to adjust at least the centre supports 60 and possibly the bridges 61 at the side to produce the curved shape formed by means of the rollers.

Figure 65:
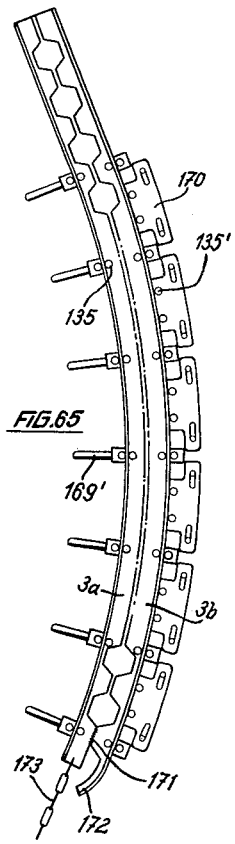

In accordance with the example, however it is also possible to arrange the roller pairs 135 in a circular or curved track, for which purpose the roller pairs 135 are adjustably guided in radial slots 169' of a supporting device (FIG. 65). Between the individual roller pairs it is possible to provide bridges 170 including further articulatedly arranged guide rollers 135'. The two girder sections 3a, 3b are tacked together at one end at 171 before being introduced into the roller track 135, 135'. The outer girder section 3b at this end is provided with a runner-shaped angle 172, which ensures that the girder sections slide reliably along the outer rollers 135'. The attached girder sections with one pull can now, for example, by means of the pulling chain 173, be drawn through the roller track 135, 135'. It is also possible for the girder to be pushed or for some of the roller pairs 135 on the inside to be adapted as conveying rollers.

Figure 64:
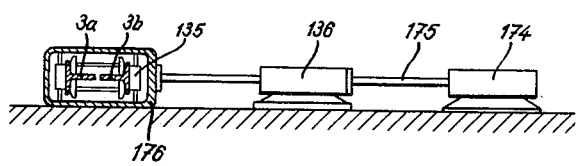

In the event of lifting cylinders of the kind shown in FIG. 63 being used it is possible in accordance with FIG. 64 to operate in multi-stage manner. A cylinder 136 is displaceably guided on the working device and adapted to actuate, via a trestle 176, the roller pairs 135 in which the girder sections 3a, 3b are guided. The displaceable cylinder 136 is connected with a second stationary lifting cylinder 174 by means of a connecting rod 175. It is however also possible to use cylinders with pistons of telescopic design.

In the event of a welding line not being parallel to the longitudinal axis of the girder it is recommended to use welding devices of the type shown in FIGS. 66 to 68. In FIG. 66 the case is assumed that a curved girder is to be welded, a rail track 125 being provided alongside the working table, a bogie 123 being adapted to roll, by means of the wheels 124 along the track 125. The welding device 38 is adapted to be transversely displaceable on this bogie 123 by means of a carriage 121 and wheels 122, so that the carriage can be transversely displaced during the movement of the bogie 123.

An alternative to this movement is shown in FIG. 67, it being assumed that a motor 129 is mounted on the bogie 123, a spindle 128 which is mounted in the pedestal bearing 132 being adapted to be turned via gears 130, 131 of the motor. The welding device 38, by way of the stirrup 127, is mounted on the one side of this spindle 128 and on the other side is adapted to be axially displaced via a bearing nut 127' when this spindle is rotated. For this purpose it is advisable to provide the spindle with a buttress thread and to secure the stirrup against tilting.

In the event of the welding seam extending parallel to the longitudinal direction of the welding direction and another welding seam having to be laid at an angle thereto, the example shown in FIG. 68 provides for a fixed welding device and for a welding device 38' adapted to be displaced at right angles, which is adjustable at the slide 126 by means of a separate drive. Such an embodiment is suitable, in particular, for welding tapering honeycomb girders with inserted web plates 6 of the type shown in FIG. 7.

It is also possible however to provide supports having guide rails in the form of suspension tracks for moving the welding unit.

Complementary to the elements shown in the figures, reference is made to the fact that it is also possible to connect a milling cutter with the guiding device 60 or the welding device 38, with which to mill the edges of the webs of the girder sections 3a, 3b before these web edges are welded together. It is moreover possible for a sandblast apparatus and a spraying device to be connected to this guiding and welding device, wherein the welded girders are completed ready for marketing.

When cutting solid-web girders 1 it may occur that the cutting line 2 (FIG. 1) extends laterally and is inaccurate. This inaccurate cutting line would have to be followed by the welding head 38 in order to obtain a reliable weld.

For this reason a centering device 144 is provided in FIGS. 69 to 71, which operates in advance of the movement of the welding head 38 thus setting a guide track 143 of the welding unit into the correct position. Herein there is provided at least one rotatably mounted disc 177 which, when a trestle 178 is displaced, moves into the gap between the webs 5 of two girder sections. Thus a plate 179, provided with the guide track 143, is adjusted according to the position of the gap relative to a fixed base 180 by means of guide wheels 181. As soon as the discs 177 have passed the gap, cross-bars 179' are tightened thus permitting the welding unit 38 to be moved along the straightened guide track 143 via similar guide wheels 181'. It is however also possible for the discs 177 to be connected with the welding unit 38 so that the latter can also be guided during the movement thereof.

There is shown moreover how the welding seam is formed advantageously in order to carry out a high quality welding. As shown in FIGS. 72 and 73 it is explained that it is an advantage for the start 139 and the end 140 of the welding seam to be welded at half the welding current power and at half the feeding rate of the welding head 38, whereas the longer centre portion 138 of the welding seam is pliantly produced. It is herewith recommended to pass repeatedly over the start and end welding points 139, 140, for example, with a circulating motion, and if necessary to lift it slightly repeatedly. The advantage of these steps consists in preventing the penetration of the welding seam and the formation of craters.

FIG. 74 shows, by way of example, how this movement of the welding head 38 can be carried out in accordance with FIGS. 73 and 72. On a bogie 141 which moves by means of guide wheels 37 and the rollers 37' on the girder sections 3a, 3b or on a separate guide track, there is arranged a couple gearing 137 comprising a crank 182, pinion 184 and an electric motor 185, on the couple of which the welding unit 38 is mounted. This couple gearing 137 is actuated when the welding head is located over the starting points 139 and 140 of the welding seam (FIGS. 72 and 73). The bogie may thus remain inoperative or also have a slow possibly reciprocating feed movement imparted thereto. Moreover the welding head may carry out a circulatory or oval closed movement path and adapted by means of a cam to be readily raised and lowered.

On the bogie 141 moreover there is arranged the driving motor 142 for driving the wheels 37 and rollers 37'. In addition thereto adjustable stops 186 and counter-contacts 187 are provided which serve the automatic control of the advance and reverse of the bogie 141. Such stops may also be provided with advantage in other welding unit constructions.

Figure 75:
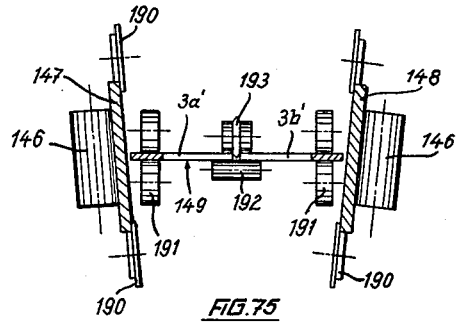
FIG. 75 is a diagrammatic cross-section through a guide roller system for producing honeycomb girders from metal strips.
Figure 76:
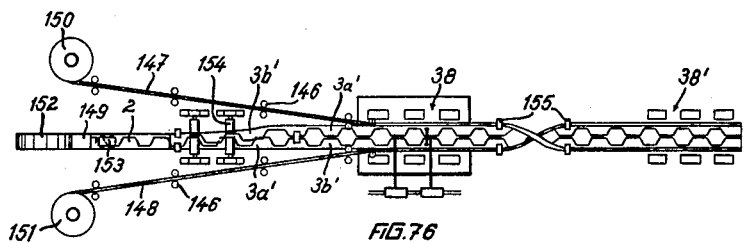
FIG. 76 is a diagrammatic side elevation of an assembly plant producing girders of the type shown in FIG. 75.
Figure 77:
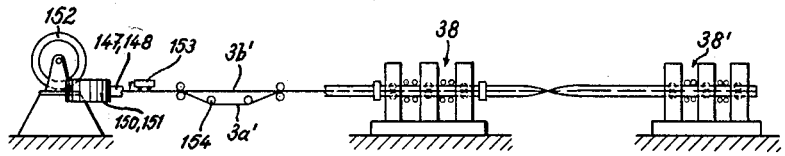
FIG. 77 is a corresponding plan.

It is shown by way of FIGS. 75 to 77, that it is possible for honeycomb girders to be assembled from strip metal and welded together. In FIG. 75 there is shown how obliquely led chord strips 147, 148 and a web strip 149 is separated in the manner of FIG. 1 is divided into the strip sections 3a' and 3b'. The chord strips 147, 148 are guided by rollers 146 and 190, which can be adjusted in accordance with the inclination of these strips. The web strips 3a' and 3b' are guided by means of the roller pairs 191 and guide rollers 192 and 193, the roller 193 simultaneously forming the clearance between the web strips 3a', 3b'. The inclination of the chord strips 147, 148 is significant when, after welding on one side, shrinkage stresses are to be feared. The inclined position then approximately corresponds to the extent of distortion of the strips to be expected after shrinkage.

FIGS. 76 and 77 show diagrammatically in side elevation and plan an overall plant for producing such girders it being assumed that the chord strips 147, 148 are wound off drums 150 and 151 and the web strip 149 not yet separated from a drum 152. The welding unit 153, which in known manner separates the web strip 149 along the line 2 is guided on a separate guide track. One web strip 3a' is then raised or lowered and led away to the side by the rollers 154 to such an extent that the web section 5 (see FIG. 3) is axially transposed. The lateral leading off and separation of the two web sections may be effected conveniently by means of slanted guide rollers. The strips 147 to 149 are then led together in accordance with FIG. 75 and introduced into the welding unit 38, which first effects the welding at one or two positions from above. The strips welded at one side are then turned through 180° in rollers 155, whereupon the underside, which is now turned face upwards, is welded in the welding device 38'. FIG. 76 to simplify illustration, shows the turning of the laminae 147 and 149 in an extremely shortened view. The endless honeycomb girder is then cut into lengths. It is also possible for the girder to be cut already after passing through the first welding unit 38 and then to carry out the second welding operation. The particular advantage of this device consists in the fact that the cutting device 153 can be put out of operation and solid-web girders without honeycomb formation to be produced with any cross-section from metal strips.

Figure 78:
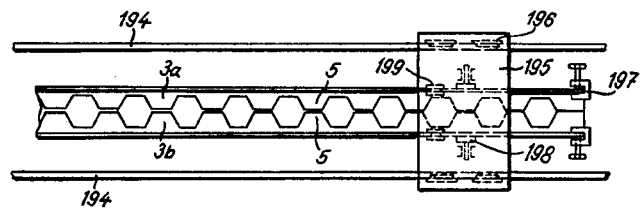
FIG. 78 is a diagrammatic plan of spot welding plant adapted to align the girder sections automatically.
Figure 79:
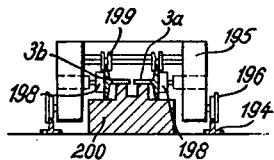
FIG. 79 is a corresponding plan.

FIGS. 78 and 79 show that the invention is not limited absolutely to the apparatus and measures described in the drawing. It is also possible to straighten the individual girder sections 3a and 3b in a straightening machine constantly available in steel works, in order then to arrange them on the supporting trestle. FIG. 78 thus provides clamping means 197 by means of which each individual girder section 3a, 3b is clamped at one end. At the side of the arranged girder section 3a, 3b there is a roller track 194 along which a welding device 195 is adapted to roll by means of wheels 196.

Within the frame 195 there are provided further rollers 199 which, when the frame 195 is displaced, engage on the flanges of the girder sections 3a, 3b and align them parallel to one another. Finally a butt welding machine 198 is arranged in the frame 195 (FIG. 7) composed of two oppositely acting pistons through which the welding current is conducted. The welding unit 195 in this example is progressively advanced and thus to such an extent that the pistons are on the same level with the web sections 5. The pistons 198 are then urged against the flanges of the girder sections 3a, 3b and the welding current conducted therethrough. This causes intense welding at the point of connection of the web sections 5. FIG. 79 moreover shows that the girder sections 3a, 3b are placed on a frame 200 and secured against tilting.

Further alternatives become evident from FIGS. 80 to 90. The fundamental conception of these figures, consists in the fact that the individual web sections 5' are bent sideways and thus in different directions, thus creating columnar girders. As shown in FIG. 80 it is possible for a flange plate 217 to be fitted at either end of these columnar girders. It is shown, moreover, that the web sections are welded to one another at points 201.

FIG. 81 is based on a normal honeycomb girder of the type shown in FIG. 3, at either end face of which is welded a girder section 3a', 3b' having bent-over web sections 5'.

An additional bracing of honeycomb columnar girders constructed in this way can thus be brought about by the fact that additional tubes 202 or other profiles are attached at the welding positions 201, the web sections 5' being welded thereto.

In the example shown in FIG. 84 an individual girder section 3a' with its bent-over web sections 5', is welded to the underside of a U-section girder 204 which can be provided or coated with a concrete filling 205.

As shown in FIG. 83 it is possible for the profile 204 to be substituted merely by a flat plate 203.

A preferred embodiment shown in FIG. 85 consists on the fact that the bent-over web sections 5' of a girder section 3a' is connected with rectilinear girder sections 3a and 3b, a U-section girder 206, also designed as a honeycomb girder, being connected between these rectilinear girder sections 3a, 3b.

FIG. 86 shows an alternative to FIG. 84, it being assumed that in place of the U-section girder 204, a tube 207 is connected with the web sections 5' of the girder section 3a'.

It is possible moreover to construct box girders of the type shown in FIGS. 87 to 89. As starting material there is used in this case a girder section 3a'' and 3b'' which has been obtained from a Z-section or U-section honeycomb girder. It is shown herein that two opposite web section pairs 5' at a time, are alternately bent outwardly and inwardly (5''), thus creating a box girder as shown in FIG. 88.

In accordance with FIG. 89 it is however also possible for the individual girder sections 3a'' and 3b'' to be connected with a solid-web girder 208.

FIG. 90 shows how the individual web sections 5' can be bent-over in a die press, it being assumed that the press is arranged in front of the welding device. An upper die 210 and a lower die 209 are herewith provided with a profiling which corresponds to the bevel of the individual web section 5'. The girder sections 3a, 3b are also laterally retained by means of presses 215 which are mounted in bearings 216. Holding down devices 212 are connected with the upper die 210 which, when the die 210 descends, come to rest on the web of the girder sections 3a, 3b and clamp it down, whereupon the upper die 210 during the continued descent effects the bending-over. The holding down devices 212 are guided in the upper die 210 by means of bolts 214 and by means of springs 213 resiliently mounted. The upper die 210 is adapted to be raised and lowered in the bearing 211.

I claim:

1. In an apparatus for producing honey-comb girders by welding together web portions of two girder sections formed by severing the web of a girder along a longitudinally undulating pattern, in combination, a support provided with guide means for directing said sections therealong; welding means disposed on said support along the path of said sections for intermittently welding the web portions thereof together; feed means for said sections longitudinally spaced from said guide means along said path with said welding means disposed between said guide and feed means, said feed means and said guide means each comprising a respective first pair of rollers journaled on said support for rotation about respective axes lying generally in a plane perpendicular to said web portions and said sections on opposite sides of said web portions, and a second pair of rollers journaled on said support for rotation about respective axes lying generally in a plane perpendicular to said web portions and said sections on opposite sides of said web portions but axially spaced from the first pair of rollers, the rollers of each of said first pairs bearing upon opposite faces of the web portion of one of said sections and upon adjacent inner flange surfaces of said one section perpendicular to its web portion, the rollers of each of said second pairs bearing upon opposite faces of the web portion of the other of said sections and upon adjacent inner flange surfaces of said other section perpendicular to its web portion; and drive means connectable with said both pairs of rollers of said feed means for positively rotating same to advance said sections, the axes of the first and second pairs of rollers of said feed means and said guide means being substantially coplanar, the rollers of each of said pairs disposed along corresponding faces of said web portions being substantially coaxial.

2. The combination as defined in claim 1 wherein said guide means includes further at least one generally cylindrical body fixedly journaled on said support for rotation about an axis parallel to an outer surface of each of said flanges and perpendicular to the respective web portions while bearing upon the respective outer surface for urging said sections against the rollers of said first and said second pair, respectively.

3. The combination as defined in claim 2 wherein at least two such cylindrical bodies are provided for each of said sections, said bodies being longitudinally spaced on opposite sides of the respective planes of the roller axes.

4. The combination as defined in claim 2, further comprising means for inactivating one of said pairs of rollers of said feed means while permitting the other of said pairs of rollers to rotate, thereby effecting a relative longitudinal displacement of said sections.

5. The combination as defined in claim 2, further comprising common carrier means for the rollers of one of said pairs, and means for laterally displacing said carrier means relative to the rollers of the other pair.

6. The combination as defined in claim 2 wherein said rollers are provided with outwardly converging frustoconical profiles in axial cross-section complementarily to the transverse-section profiles of said girder sections at the junctions of their flanges with the respective web portions.

7. The combination as defined in claim 2 wherein said rollers are formed with discontinuities along their peripheries to effect positive entrainment of said sections.

References Cited by the Examiner
UNITED STATES PATENTS

| | | | |
|---|---|---|---|
| 972,928 | 10/10 | Schneider | 219—101 X |
| 1,623,249 | 4/27 | Kahn | 219—102 |
| 1,667,585 | 4/28 | Chapman | 219—124 |
| 1,762,085 | 6/30 | Stedefeld | 219—101 |
| 1,831,343 | 11/31 | Caldwell | 219—124 |
| 2,002,044 | 5/35 | Rothenstein | 189—37 |
| 2,179,802 | 11/39 | Sykes | 219—102 |
| 2,441,748 | 5/48 | Black | 219—124 |
| 2,452,189 | 10/48 | Helmkamp | 219—124 X |
| 2,602,869 | 7/52 | Peck et al. | 219—125 |
| 2,778,459 | 1/57 | Hecker et al. | 189—37 |

RICHARD M. WOOD, *Primary Examiner.*

JOEL REZNEK, MAX L. LEVY, JOSEPH V. TRUHE, Sr., *Examiners.*